H. MARTINSON.
SEPARATOR.
APPLICATION FILED MAY 15, 1914.
1,111,227.
Patented Sept. 22, 1914.
2 SHEETS—SHEET 1.
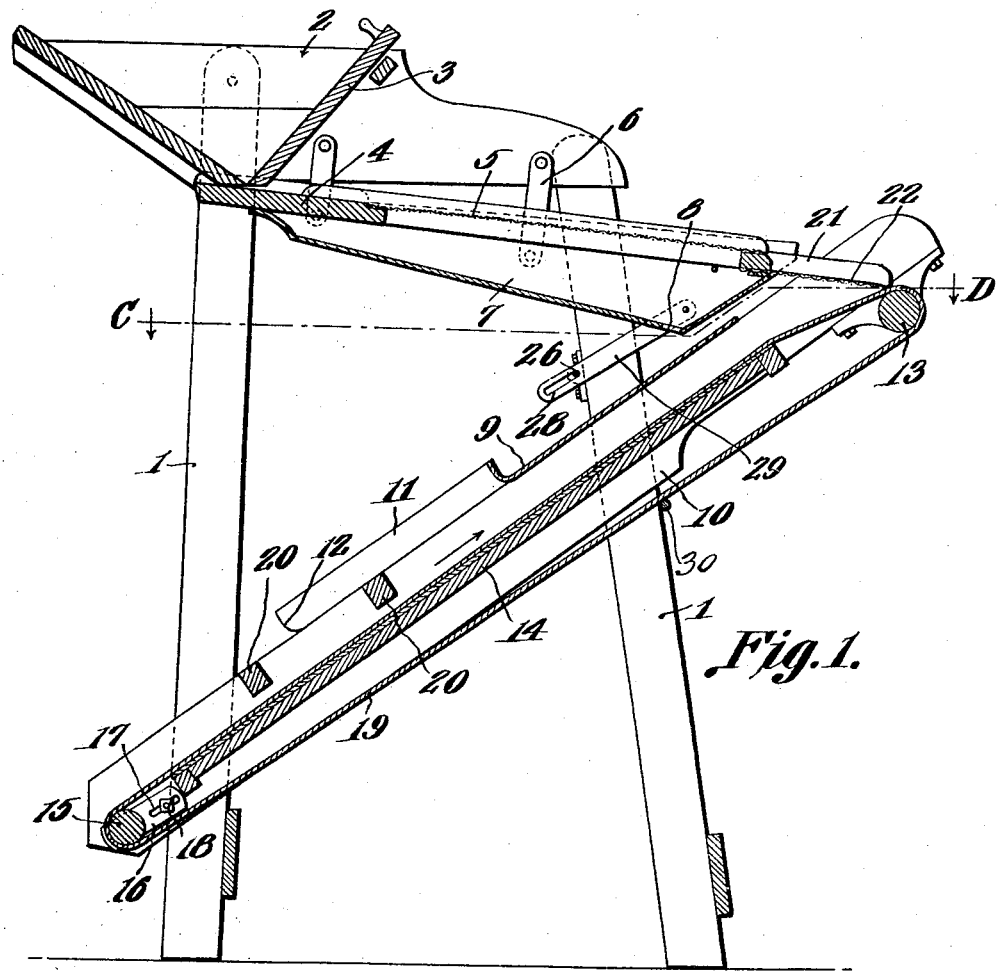
Fig. 1.
Fig. 4.
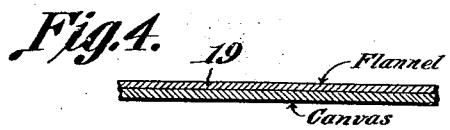
Witnesses
Henry Martinson,
Inventor
by C. A. Snow & Co.
Attorneys

H. MARTINSON.
SEPARATOR.
APPLICATION FILED MAY 15, 1914.

1,111,227.

Patented Sept. 22, 1914.
2 SHEETS—SHEET 2.

Witnesses

Henry Martinson,
Inventor by C. A. Snow & Co.
Attorneys

UNITED STATES PATENT OFFICE.

HENRY MARTINSON, OF ELBOW LAKE, MINNESOTA.

SEPARATOR.

1,111,227.  Specification of Letters Patent.  Patented Sept. 22, 1914.

Application filed May 15, 1914. Serial No. 838,785.

*To all whom it may concern:*

Be it known that I, HENRY MARTINSON, a citizen of the United States, residing at Elbow Lake, in the county of Grant and State of Minnesota, have invented a new and useful Separator, of which the following is a specification.

This invention relates to separators especially designed for use in the separation of wild oats, wheat, etc., one of its objects being to provide, in connection with the separating screens, a means whereby the wild oats are retarded and held in their downward movement from the screens, thus to separate them from the wheat which passes freely over the said means.

A further object is to provide retarding means which can be adjusted to suit the kind of grain with which it is used.

Another object is to provide a means for keeping the grain spread out while descending.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings, the preferred form of the invention has been shown.

Figure 2:
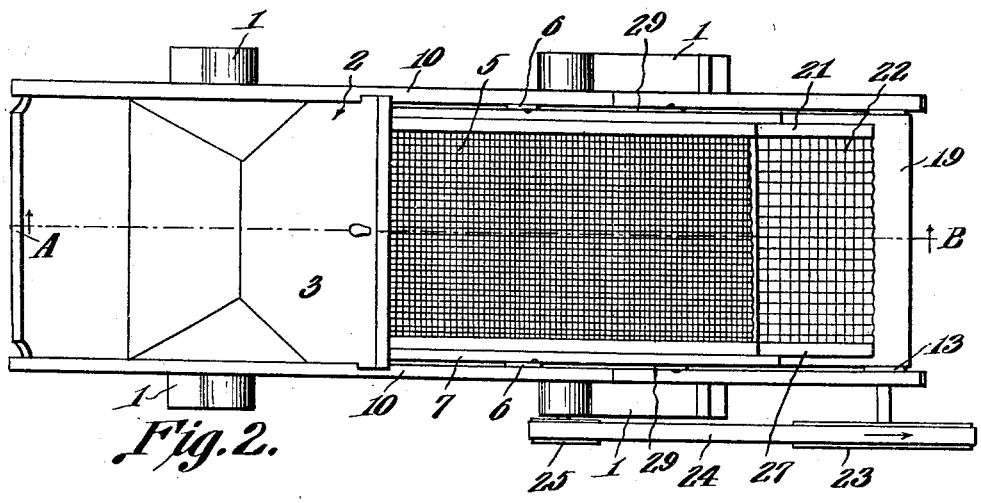
Figure 3:
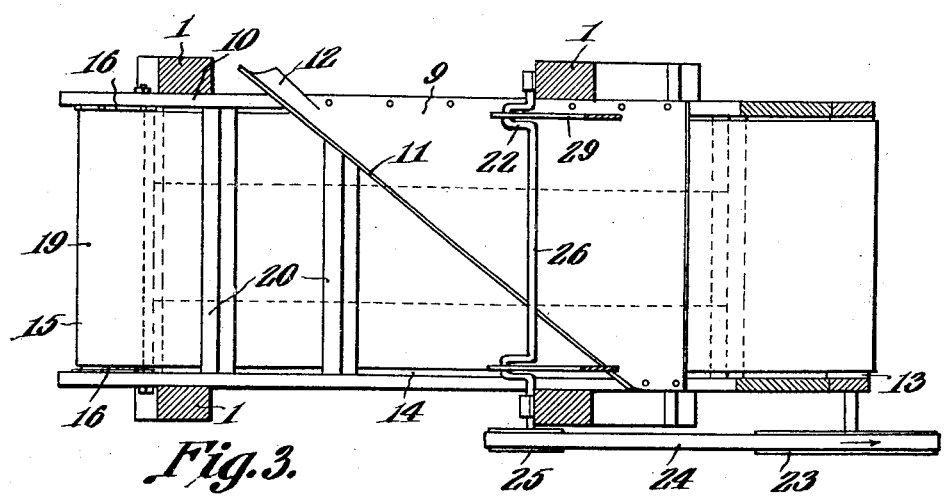

In said drawings:—Figure 1 is a vertical section through the machine on the line A—B Fig. 2. Fig. 2 is a plan view. Fig. 3 is a section on the line C—D Fig. 1. Fig. 4 is an enlarged section through a portion of the apron.

Referring to the figures by characters of reference 1 designates standards supporting a hopper 2 provided with a gate valve 3 for controlling the outflow of grain onto a board 4 located at the upper end of a screen 5. This screen is suspended in an inclined position below the hopper by links 6 and has a hopper 7 arranged thereunder and movable therewith, this hopper extending the full length of the screen. Said hopper 7 has an outlet 8 through which screenings pass onto an inclined plate 9 supported by inclined side strips 10 secured to standards 1. This inclined plate has a diagonally disposed deflecting flange 11 at its lower edge for diverting screenings laterally into a spout 12.

A roller 13 is supported by the upper ends of strips 10 and a board 14 is also supported by said strips and extends throughout the greater portion of the length thereof. Another roller 15 is journaled in arms 16 located between the lower ends of strips 10 and these arms have slots 17 for the reception of bolts 18 engaging strips 10. Thus it will be seen that arms 16 can be adjusted angularly and longitudinally to bring the roller 15 to any desired position relative to the lower end of board 14. An endless apron 19, preferably formed of flannel having a canvas backing, is mounted on the rollers and has its upper flight supported by and slidable on the board 14 and extending under the plate 9.

Cross strips 20 are secured to the side strips 10 and are located close to but spaced from the apron.

Extending from the delivery end of screen 5 at the sides thereof are arms 21 to which is secured a coarse mesh screen 22 onto which the tailings from screen 5 are adapted to discharge. This screen extends up to the roller 13 and is designed to project thereover during the reciprocation of the screen so that tailings from screen 5 will be discharged over the roller 13. Secured to and revoluble with roller 13 is a wheel 23 which can be in the form of a pulley or a sprocket and which transmits motion through a belt or chain 24 to a wheel 25 secured to a shaft 26. This shaft is journaled on certain of the standards 1 and has cranks 26 mounted in slots 28 formed in links 29 which are pivotally connected to the sides of the hopper 7.

It is to be understood that when the wheel 23 is set in motion in the direction indicated by arrows, the belt will be actuated, the upper flight thereof moving upwardly over the board 14. Motion will be transmitted through wheel 23, belt or chain 24 and wheel 25 to shaft 26 and the links 29 will thus rapidly reciprocate the screens.

By opening the valve 3 grain contained in hopper 2 will gravitate onto board 4 and thence to screen 5 along which it will be worked by the reciprocation of the screen. The fine particles will fall through the screen and onto the plate 9 from which they will be discharged through spout 12. The remainder of the grain will flow off of the end of screen 5 and onto the coarse screen 22 where a separation will again be effected, the grain falling through screen 22 while large undesirable particles, such as stones, will be discharged as tailings over the upper end of apron 19. The grain falling through screen 22 will drop onto the upper portion of the upwardly moving upper flight of apron 19 and its downward movement due to gravitation will be partly offset by the upward movement of the apron flight so that the descent of the grain will be very slow. Consequently any wild oats mixed with the wheat or other grain, will have ample time to become entangled in the woolly nap or finish of the flannel while the wheat will slowly slide downwardly over the apron. The strips 20 keep the grain spread out over the apron so that the grain will not pile up and jump off of the apron. The entangled wild oats will be carried up by the apron and can be removed therefrom in any suitable manner, as by means of a scraping wire 30.

By raising and lowering the roller 15 and the lower portion of the apron the apparatus can be adapted for use with different kinds of grain. For example, where wheat is to be separated, the degree of rise of the apron should be less than where oats are being separated.

What is claimed is:—

1. A separator including a stationary inclined board, a roller journaled adjacent the upper end of the board, angularly adjustable arms mounted adjacent the lower end of the board, a roller carried thereby, an endless apron having an upwardly movable upper flight extending along the top of the board, and cross strips fixedly mounted relative to the board and disposed transversely above the apron, said arms being adjustable angularly to adjust the upper flight of the apron toward or from the strips.

2. A separator including a screen, a second screen for receiving tailings therefrom, a hopper for receiving screenings from the first named screen, a spout, means for deflecting said screenings from the hopper to the spout, and upwardly movable means for retarding the gravitation of screenings from the second screen.

3. A separator including a screen, a second screen for receiving tailings therefrom, a hopper for receiving the screenings from the first named screen, a spout, means for deflecting said screenings from the hopper to the spout, and an inclined apron having an upwardly moving upper flight, for retarding gravitation of screenings from the second screen.

4. A separator including a screen, a second screen for receiving tailings therefrom, a hopper for receiving screenings from the first named screen, a spout, means for deflecting said screenings from the hopper to the spout, and an inclined apron having an upwardly moving upper flight for retarding gravitation of screenings from the second screen, said second screen being adapted to discharge its tailings over and past the upper end of the apron.

In testimony that I claim the foregoing as my own, I have hereto affixed my signature in the presence of two witnesses.

HENRY MARTINSON.

Witnesses:
C. J. HARRISON,
R. J. STROMME.

---

Copies of this patent may be obtained for five cents each, by addressing the "Commissioner of Patents, Washington, D. C."